(12) United States Patent
Wang et al.

(10) Patent No.: US 8,074,322 B2
(45) Date of Patent: Dec. 13, 2011

(54) HINGE ASSEMBLY AND ELECTRONIC DEVICE USING THE SAME

(75) Inventors: Jin-Xin Wang, Shenzhen (CN); Wen-Ming Wu, Shenzhen (CN)

(73) Assignees: Hong Fu Jin Precision (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 442 days.

(21) Appl. No.: 12/347,505

(22) Filed: Dec. 31, 2008

(65) Prior Publication Data

US 2010/0064475 A1 Mar. 18, 2010

(30) Foreign Application Priority Data

Sep. 17, 2008 (CN) .......................... 2008 1 0304536

(51) Int. Cl.
*E05D 11/08* (2006.01)
(52) U.S. Cl. ........................................................ 16/342
(58) Field of Classification Search .................... 16/342, 16/340, 337–339, 303, 330; 361/679.08, 361/679.11, 679.12, 679.27; 455/575.1, 455/575.3
See application file for complete search history.

(56) References Cited

U.S. PATENT DOCUMENTS

| 4,617,699 | A   | * | 10/1986 | Nakamura  | 16/262 |
|-----------|-----|---|---------|-----------|--------|
| 5,943,738 | A   | * | 8/1999  | Karfiol   | 16/342 |
| 6,393,662 | B1  | * | 5/2002  | Huang et al. | 16/273 |
| 6,470,532 | B2  | * | 10/2002 | Rude      | 16/335 |
| 6,983,514 | B2  | * | 1/2006  | Lu et al. | 16/342 |
| 7,036,187 | B2  | * | 5/2006  | Rude      | 16/342 |
| 7,578,032 | B2  | * | 8/2009  | Chen      | 16/374 |
| 2003/0126719 | A1 | * | 7/2003 | Chen     | 16/342 |
| 2005/0204509 | A1 | * | 9/2005 | Lin et al. | 16/342 |
| 2006/0288535 | A1 | * | 12/2006 | Lu et al. | 16/387 |

FOREIGN PATENT DOCUMENTS

JP  10047337 A  *  2/1998
WO  WO 9514842 A1  *  6/1995

* cited by examiner

*Primary Examiner* — Chuck Y. Mah
(74) *Attorney, Agent, or Firm* — Altis Law Group, Inc.

(57) ABSTRACT

A hinge assembly includes a pivot shaft defining a latching recess, a second leaf non-rotatably connected to the pivot shaft, a first leaf rotatably connected to the pivot shaft, and a clasping member fixed on the first leaf. The clasping member includes a receiving portion sleeved on the pivot shaft, and an elastic portion adjacent to the receiving portion. A part of the elastic portion engages in the latching recess of the pivot shaft, and the part of the elastic portion is separated from the receiving portion.

14 Claims, 6 Drawing Sheets

HINGE ASSEMBLY AND ELECTRONIC DEVICE USING THE SAME

BACKGROUND

1. Technical Field

The present disclosure generally to hinge assemblies and, more particularly, to a hinge assembly typically used for an electronic device.

2. Description of Related Art

An electronic device such as a mobile phone, a notebook computer, or a personal digital assistant, generally has a main body and a display cover pivotally connected to the main body via a hinge assembly.

A typical hinge assembly includes a fixing member and a rotating member. The fixing member includes a fixing portion, and a sleeve formed on a side of the fixing portion. The rotating member includes a mounting portion, and a rotary shaft extending from the mounting portion. A latching protrusion is formed on an inner surface of the sleeve. A latching groove is defined in an outer surface of the rotary shaft. The rotary shaft is inserted into the sleeve, so that the rotating member can be rotated relative to the fixing member. When the rotating member is rotated to a predetermined position, the latching protrusion of the sleeve is engaged in the latching groove of the rotary shaft, thereby retaining the rotating member in the predetermined position. Moreover, the rotating member may be retained in any other desired position via a frictional force generated between the sleeve and the rotary shaft.

However, when the rotating member is rotated to another desired position, the latching protrusion slides out of the latching groove, and abuts against an outer surface of the rotary shaft, so that a portion of the sleeve adjoining the latching protrusion will become warped and no longer tightly contact the rotary shaft. As a result, the rotating member may not be retained stably in the desired position.

What is needed, therefore, is a new hinge assembly that overcomes the above mentioned disadvantages.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views, and all the views are schematic.

DETAILED DESCRIPTION OF THE EMBODIMENTS

The present hinge assembly can be used in electronic devices such as notebook computers, personal digital assistants, or mobile phones. Hereinafter, for the purposes of conveniently describing the present disclosure, an embodiment of the hinge assembly as used in a notebook computer is described and illustrated.

Figure 1:
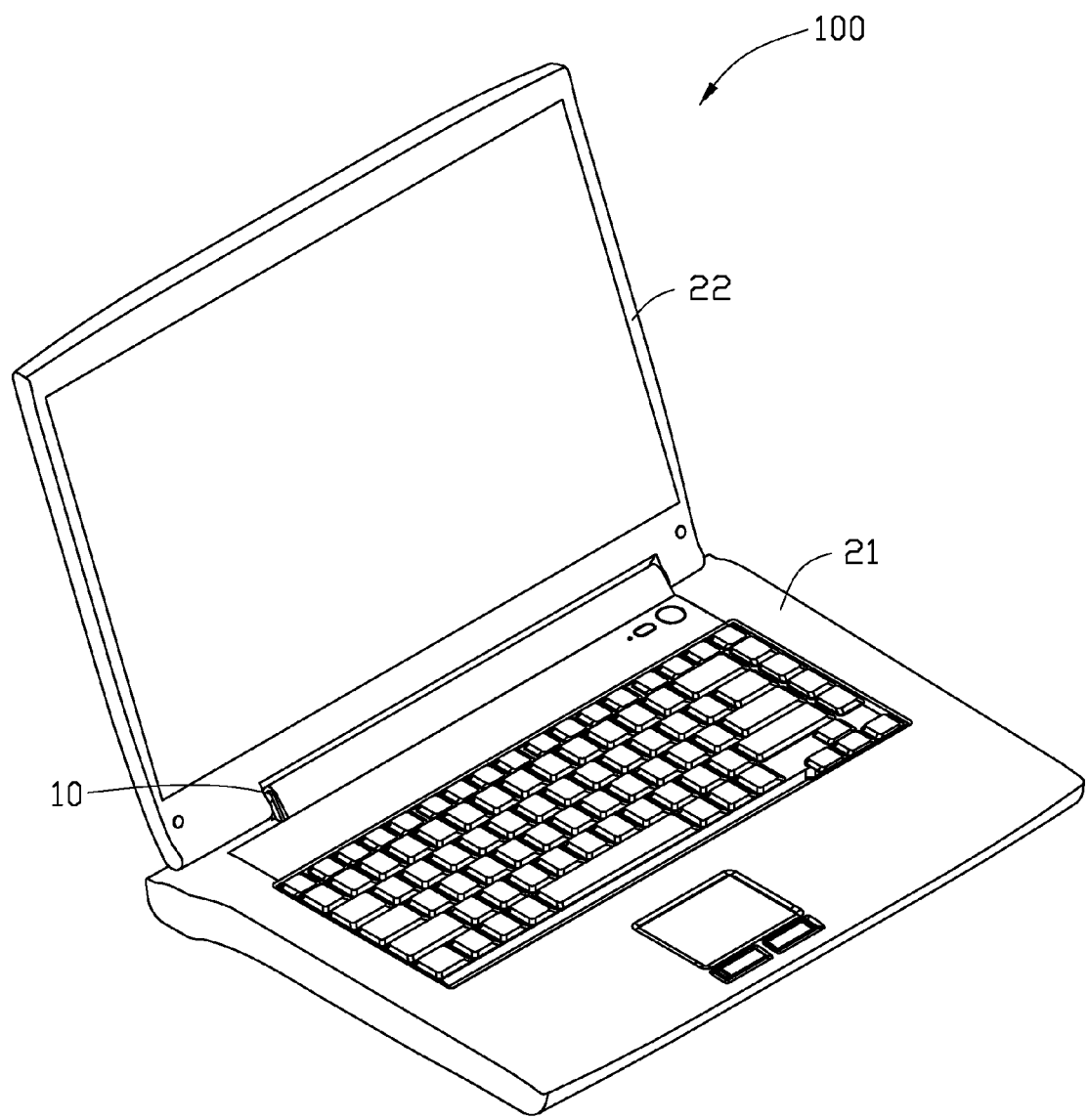
FIG. 1 is an isometric view of an embodiment of a hinge assembly assembled in a collapsible electronic device such as a notebook computer.
Figure 2:
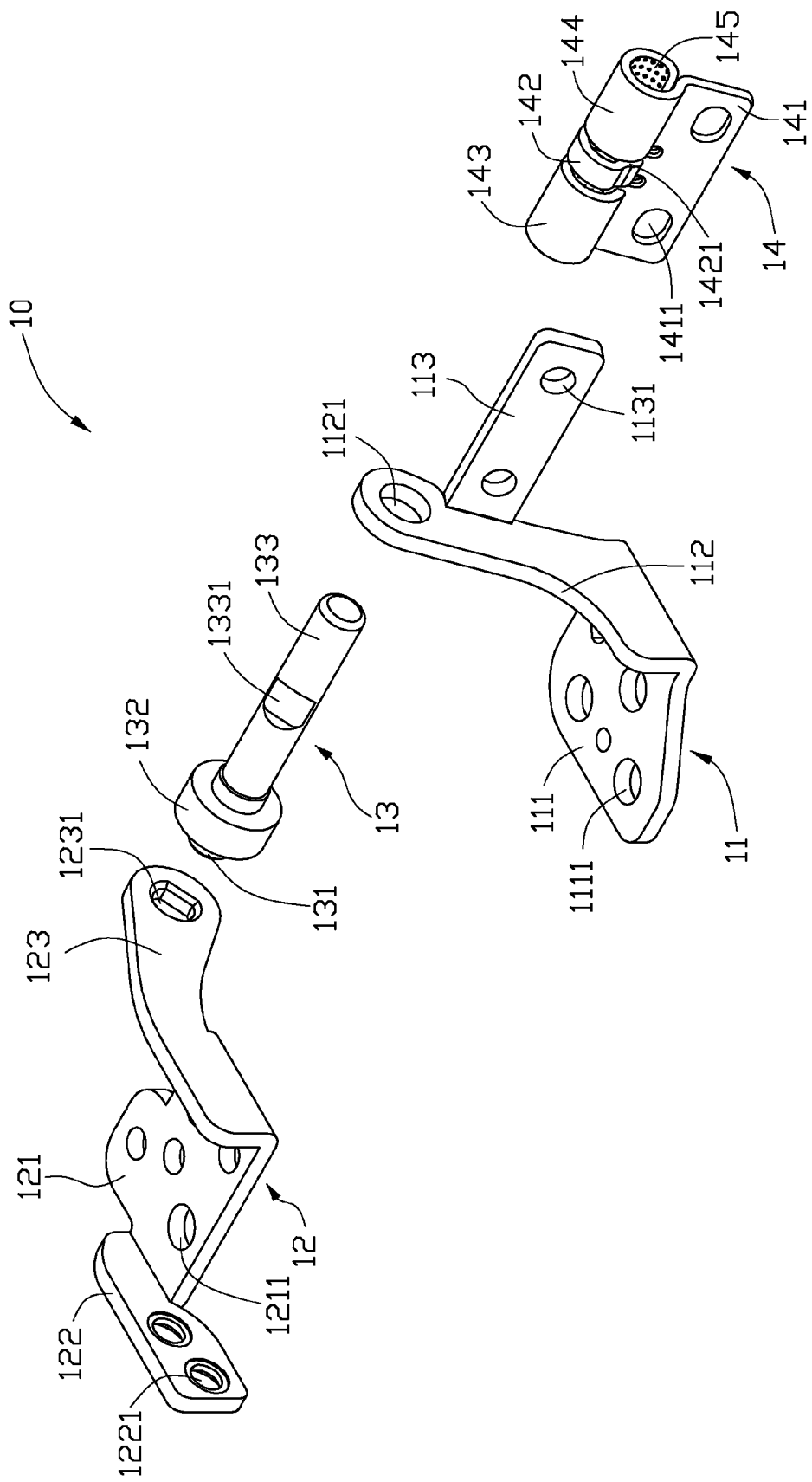
FIG. 2 is an exploded, isometric view of the hinge assembly in FIG. 1.

Referring to FIGS. 1 and 2, an embodiment of a notebook computer 100 includes a hinge assembly 10, a main body 21, and a display cover 22 pivotally connected to the main body 21 via the hinge assembly 10. The hinge assembly 10 includes a first leaf 11, a second leaf 12, a pivot shaft 13, and a clasping member 14.

The first leaf 11 includes a mounting plate 111, a supporting plate 112 extending substantially perpendicularly from a side of the mounting plate 111, and a fixing plate 113 extending substantially perpendicularly from a side of the supporting plate 112. The mounting plate 111 defines a plurality of mounting holes 1111 configured to fix the first leaf 11 on the main body 21. The supporting plate 112 defines a substantially circular pivot hole 1121 in an end away from the mounting plate 111. The fixing plate 113 defines two fixing holes 1131 on the fixing plate 113.

The second leaf 12 includes a mounting plate 121, a connecting plate 122 extending perpendicularly from a first side of the mounting plate 121, and an arched rotating plate 123 extending substantially perpendicularly from a second side of the mounting plate 121. The mounting plate 121 defines a plurality of mounting holes 1211 configured to fix the second leaf 12 on the display cover 22. The connecting plate 122 defines two fixing holes 1221 on the connecting plate 122. The rotating plate 123 defines a non-circular pivot hole 1231 in an end away from the mounting plate 121.

The pivot shaft 13 includes a shaft head 131, a flange 132 formed around the pivot shaft 13 adjacent to the shaft head 131, and a shaft portion 133 extending substantially perpendicularly from a center portion of the flange 132. A cross-section of the shaft head 131 is shaped as the shape of the pivot hole 1231. The shaft portion 133 may be substantially a cylindrical rod, and defines a latching recess 1331 in a middle section of the shaft portion 133. In the illustrated embodiment, the latching recess 1331 is formed by flattening the middle section of the shaft portion 133. The latching recess 1331 may be other shaped recesses, such as a rectangular recess, a circular recess, and so on.

The clasping member 14 includes a positioning plate 141, an elastic portion 142 formed on a middle portion of a side of the positioning plate 141, and two receiving portions 143, 144 formed on opposite sides of the elastic portion 142. The elastic portion 142 is separated from the receiving portions 143, 144. The positioning plate 141 defines two fixing holes 1411 corresponding to the fixing holes 1131 of the first leaf 11. The elastic portion 142 may be substantially C-shaped, and an end of the elastic portion 142 is bent to form a latching protrusion 1421. The receiving portions 143, 144 may be both substantially cylinder shaped and having a cavity 145 passing through the receiving portions 143, 144. An inner diameter of the receiving portions 143, 144 is slightly less than an outer diameter of the shaft portion 133. In the illustrated embodiment, a plurality of lubricant grooves are defined on inner surfaces of the elastic portion 142 and the receiving portions 143, 144 for storing lubricant.

Figure 3:
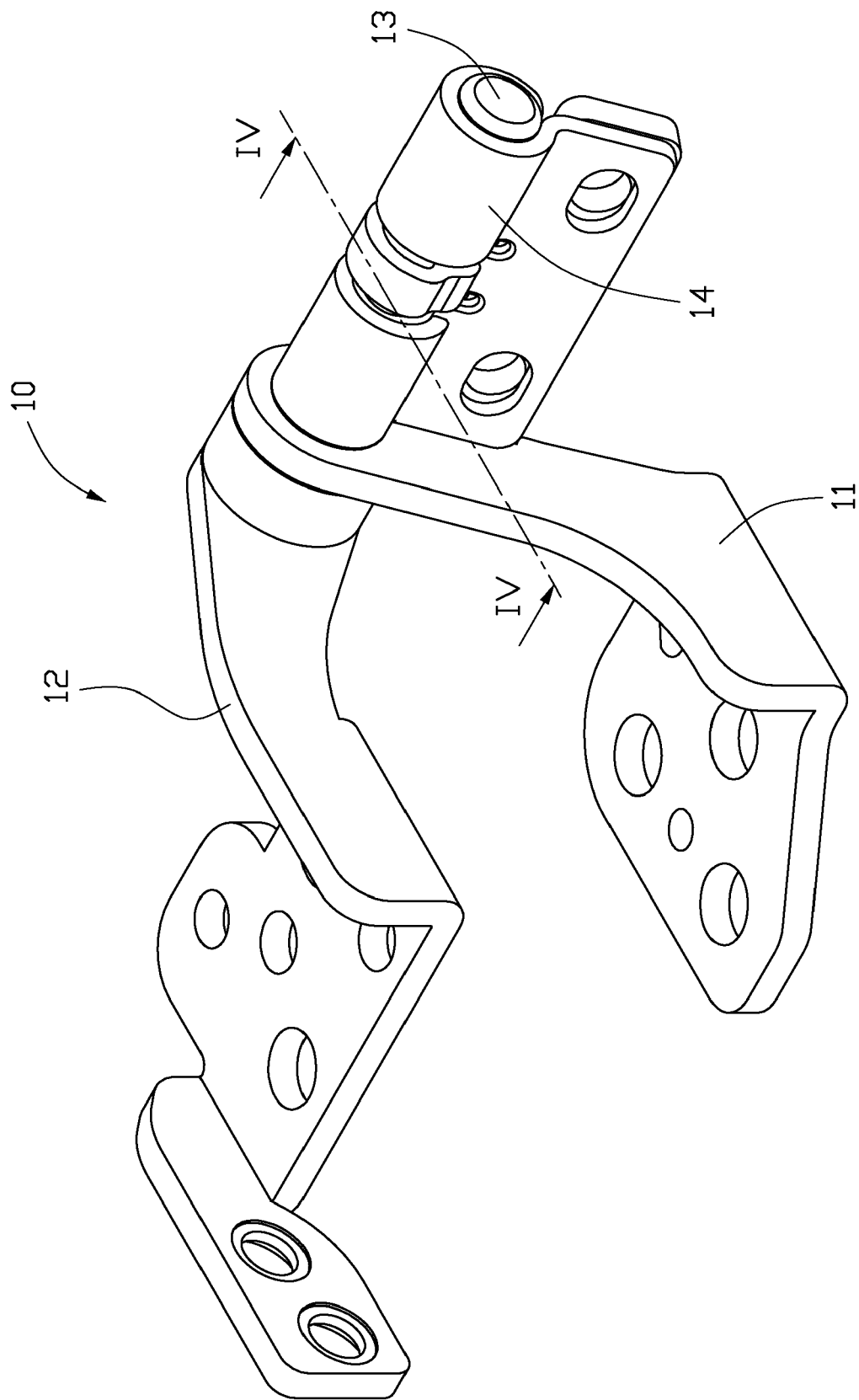
FIG. 3 is an assembled, isometric view of the hinge assembly in FIG. 2.

Referring also to FIG. 3, in assembling the hinge assembly 10, the positioning plate 141 of the clasping member 14 is fixed on the fixing plate 113 of the first leaf 11. The shaft portion 133 of the pivot shaft 13 is passed through the pivot hole 1121 of the first leaf 11, and the cavity 145 of the receiving portions 143, 144. The shaft head 131 of the pivot shaft 13 is inserted in the pivot hole 1231 of the second leaf 12, such that, the pivot shaft 13 is non-rotatably connected to the second leaf 12, but rotatably connected to the first leaf 11 and the clasping member 14.

Figure 4:
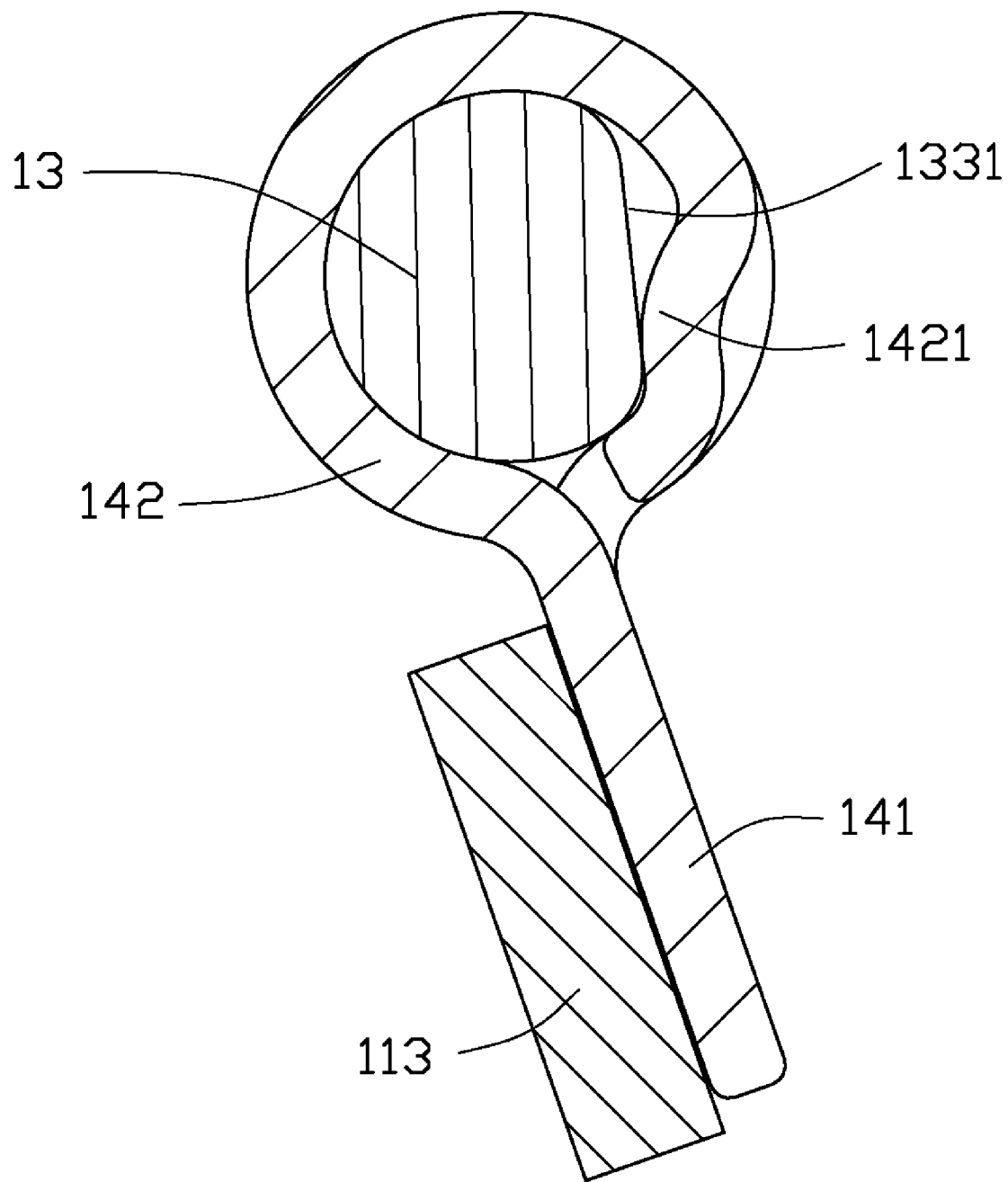
FIG. 4 is a cross-sectional view of the hinge assembly taken along line IV-IV in FIG. 3.

Referring also to FIG. 4, when the hinge assembly 10 is in a closed position, the latching protrusion 1421 of the elastic portion 142 engages in the latching recess 1331 of the pivot shaft 13. Thus, the second leaf 12 is retained in the closed position. Alternatively, the latching recess 1331 may be configured to engage with the latching protrusion 1421 when the second leaf 12 has rotated to a largest angle relative to the first leaf 11. The shaft portion 133 may define two or more latching recesses 1331 to engage with the latching protrusion 1421, so that the second leaf 12 can be retained in a plurality of predetermined engaging positions.

Figure 5:
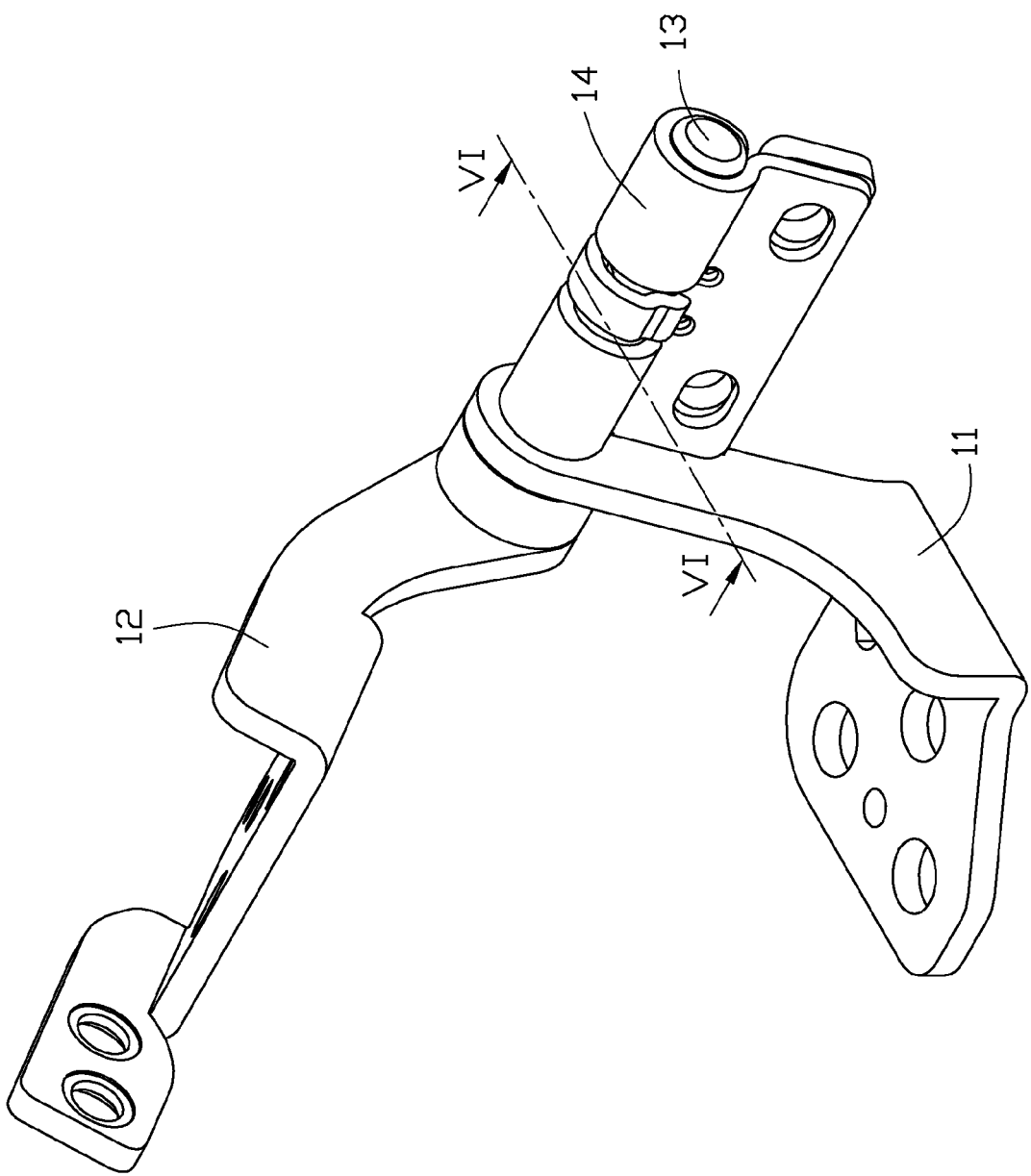
FIG. 5 is an assembled, isometric view of the hinge assembly in FIG. 2, shown in a different state.
Figure 6:
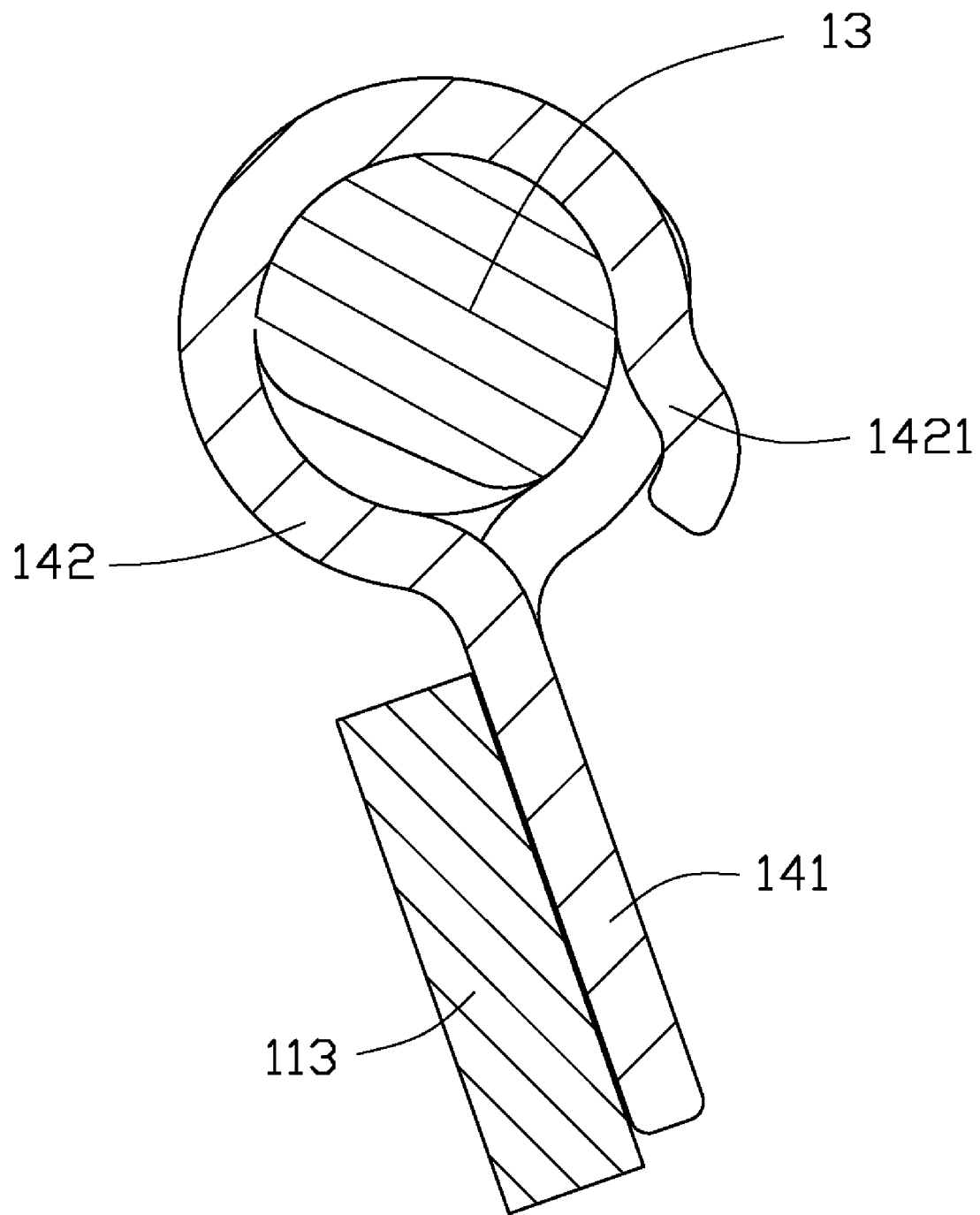
FIG. 6 is a cross-sectional view of the hinge assembly taken along line VI-VI in FIG. 5.

Referring to FIGS. 5 and 6, when the hinge assembly 10 is opened, the second leaf 12 is rotated relative to the first leaf 11. The pivot shaft 13 rotates together with the second leaf 12, and the latching protrusion 1421 disengages form the latching recess 1331, and abuts against the cylindrical surface of the shaft portion 133. The elastic portion 142 resiliently deforms at the end having the latching protrusion 1421. Since the elastic portion 142 is separated from the receiving portions 143, 144, the deformation of the elastic portion 142 does not affect the receiving portions 143, 144. Thus, the receiving portions 143, 144 are always tightly clasping the shaft portion 133. As a result, when the second leaf 12 has been rotated to a desired position relative to the first leaf 11, the second leaf 12 can be retained stably via a frictional force generated between the receiving portions 143, 144 and the shaft portion 133.

In other alternative embodiments, the latching protrusion 1421 may be omitted, if a part of the elastic portion 142, such as an end of the elastic portion 142 can be engaged in the latching recess 1331. The elastic portion 142 may be integrally formed with the receiving portions 143, 144 except that the part of the elastic portion 142 engaging in the latching recess 1331 is separated from the receiving portions 143, 144. Moreover, the second leaf 12 may be integrally formed with the pivot shaft 13, and the pivot hole 1231 and the shaft head 131 are omitted. The clasping member 14 may also be integrally formed with the first leaf 11.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A hinge assembly, comprising:
   a pivot shaft defining at least one latching recess;
   a second leaf non-rotatably connected to the pivot shaft;
   a first leaf rotatably connected to the pivot shaft; and
   a clasping member fixed on the first leaf, and comprising at least one receiving portion sleeved on the pivot shaft, and an elastic portion adjacent to the at least one receiving portion and separated from the at least one receiving portion;
   wherein the elastic portion is substantially C-shaped and comprises a latching protrusion disposed adjacent to a distal end of the elastic portion, the latching protrusion forms two engaging recessions at an interior of the latching protrusion, the latching protrusion is engageable with the at least one latching recess of the pivot shaft, and the two engaging recessions are engageable with the pivot shaft to hold the pivot shaft in two different engaging positions relative to the clasping member, respectively.

2. The hinge assembly of claim 1, wherein the pivot shaft comprises a shaft head; the second leaf defines a non-circular pivot hole therein; a cross-section of the shaft head is shaped as the shape of the pivot hole; the shaft head is inserted in the pivot hole.

3. The hinge assembly of claim 1, wherein the first leaf defines a circular pivot hole therein; the pivot shaft is passed through the circular pivot hole of the first leaf.

4. The hinge assembly of claim 1, wherein the at least one receiving portion comprises two receiving portions formed on opposite sides of the elastic portion; the elastic portion is separated from the receiving portions.

5. The hinge assembly of claim 1, wherein the at least one receiving portion is substantially cylinder shaped and having a cavity passing through the receiving portion; the pivot shaft is passed through the cavity.

6. The hinge assembly of claim 5, wherein an inner diameter of the at least one receiving portion is slightly less than an outer diameter of the pivot shaft.

7. The hinge assembly of claim 5, wherein an inner surface of the at least one receiving portion defines a plurality of lubricant grooves therein.

8. The hinge assembly of claim 1, wherein the second leaf is integrally formed with the pivot shaft; the clasping member is integrally formed with the first leaf.

9. The hinge assembly of claim 1, wherein the at least one latching recess is formed by flattening a middle section of the pivot shaft.

10. An electronic device, comprising:
    a main body;
    a display cover; and
    a hinge assembly pivotally connecting the display cover to the main body, the hinge assembly comprising:
    a pivot shaft defining at least one latching recess;
    a second leaf fixed on the display cover and non-rotatably connected to the pivot shaft;
    a first leaf fixed on the main body and rotatably connected to the pivot shaft; and
    a clasping member fixed on the first leaf, and comprising at least one receiving portion sleeved on the pivot shaft, and an elastic portion adjacent to the at least one receiving portion and separated from the receiving portion;
    wherein the elastic portion is substantially C-shaped and comprises a latching protrusion disposed adjacent to a distal end of the elastic portion, the latching protrusion forms two engaging recessions at an interior of the latching protrusion, the latching protrusion is engageable with the at least one latching recess of the pivot shaft, and the two engaging recessions are engageable with the pivot shaft to hold the pivot shaft in two different engaging positions relative to the clasping member, respectively.

11. The electronic device of claim 10, wherein the second leaf comprises a flat plate defining a plurality of mounting holes configured to fix the second leaf on the display cover.

12. The electronic device of claim 10, wherein the first leaf comprises a mounting plate defining a plurality of mounting holes configured to fix the first leaf on the main body.

13. The electronic device of claim 10, wherein the at least one receiving portion is substantially cylinder shaped and has a cavity passing through the receiving portion; the pivot shaft is passed through the cavity.

14. The electronic device of claim 13, wherein an inner diameter of the receiving portion is slightly less than an outer diameter of the pivot shaft.

* * * * *